United States Patent
Tang

(10) Patent No.: US 6,480,401 B2
(45) Date of Patent: Nov. 12, 2002

(54) METHOD AND APPARATUS FOR REDUCING STANDBY POWER IN POWER SUPPLIES

(75) Inventor: Allen Tang, Valiant Park (HK)

(73) Assignee: Astec International Limited (HK)

( * ) Notice: Subject to any disclaimer, the term of this patent is extended or adjusted under 35 U.S.C. 154(b) by 0 days.

(21) Appl. No.: 09/805,625

(22) Filed: Mar. 13, 2001

(65) Prior Publication Data

US 2002/0131279 A1 Sep. 19, 2002

(51) Int. Cl.[7] .............................................. H02M 3/335
(52) U.S. Cl. ................................................... 363/21.02
(58) Field of Search ........................ 363/16, 20, 21.01, 363/21.12, 21.15, 21.18, 95, 97, 131

(56) References Cited

U.S. PATENT DOCUMENTS

| | | | |
|---|---|---|---|
| 5,469,349 A | * 11/1995 | Marinus | 363/21 |
| 5,481,178 A | 1/1996 | Wilcox et al. | |
| 5,731,694 A | 3/1998 | Wilcox et al. | |
| 5,920,466 A | * 7/1999 | Hirahara | 363/21 |
| 5,994,885 A | 11/1999 | Wilcox et al. | |
| 5,995,384 A | * 11/1999 | Majid et al. | 363/21 |
| 5,995,388 A | * 11/1999 | Preller | 363/21 |
| 6,104,622 A | * 8/2000 | Shin | 363/21 |
| 6,288,914 B1 | * 9/2001 | Sato | 363/18 |

OTHER PUBLICATIONS

Philips Semiconductors (Product Brochure), "Product Specification TEA1523 STARplug+™," Nov. 17, 1999, pp. 1–18.
SGS–Thomson Microelectronics (Product Brochure), "Full Integrated Power Supply Flips™, L6590," Mar. 1998, pp. 1–8.
SGS–Thomson Microelectronics (Product Brochure), "Primary Controller with Standby, L5991, L5991A," Aug. 1998, pp. 1–23.

* cited by examiner

Primary Examiner—Matthew Nguyen
(74) Attorney, Agent, or Firm—Coudert Brothers LLP

(57) ABSTRACT

Power consumption of a low-power flyback power converter under standby-load or no-load conditions is reduced by modulating the OFF time of the flyback transformer's main switch as a function of the feedback control current when the load drops below a predetermined level. This modulation overcomes the conventional frequency-increasing modulation of the ON time at low output power levels so as to reduce the switching frequency, and hence the switching losses, to minimal levels as the load is reduced. Excessive frequency reduction can optionally be avoided by a clamping feature that limits the expansion of the OFF time.

10 Claims, 4 Drawing Sheets

METHOD AND APPARATUS FOR REDUCING STANDBY POWER IN POWER SUPPLIES

FIELD OF INVENTION

This invention relates to low-power power supplies, and more particularly to circuitry for varying both the ON time and the OFF time of the main current switch in a flyback converter type power supply when the load drops below a predetermined level, so as to reduce the power consumption of the power supply when the device being powered is in a "sleep" mode or turned off.

BACKGROUND OF THE INVENTION

The recent proliferation of rechargeable electronic equipment, such as mobile telephones, PDA's and notebook computers has dramatically increased the number of chargers connected to the public electricity supply. These chargers typically have no on/off switch and are frequently left permanently "plugged-in" to the wall socket. The "standby" power consumption (i.e., when the equipment is off and any batteries fully charged) of current technology chargers places a significant load on the public electricity supply. It has been estimated that in Europe, such chargers unnecessarily consume the equivalent of the output of three power stations. Environmental and economic considerations therefore make it desirable to significantly reduce the standby power of electronic equipment and chargers. In Germany, regulations known as "Blue Angel", provide, for example, that cellular phone chargers or personal computers may not consume more than 0.5 W when the equipment is off (i.e., an open load), or 5 W when the equipment is in "sleep" mode.

Inexpensive low-power conversion systems such as those typically used in cell phone or laptop computer chargers usually use a simple and low-cost self-oscillation flyback converter topology. This type of converter uses pulse width modulation with a fixed OFF time and a variable ON time to accommodate the power requirements of the load. The lighter the load, the higher the switching frequency and hence the higher the switching loss. In conditions where the device is being powered in a "sleep" mode or turned off, the switching loss becomes substantial and needs to be remedied.

Conventionally, excessive switching loss is reduced by "burst mode" operation in which the pulse width modulator is randomly switched between an OFF mode and an ON mode. The burst rate is unpredictable and is affected by a number of factors, such as the loop response and other second-order circuit parameters. This method has several major problems:

1) The circuit consumes high power at no load and light load, especially before the "burst mode" operation is activated;
2) The unpredictable random "burst" operation may create electromagnetic interference and ripple problems;
3) The system has poor flexibility in setting the operational point at which power saving is initiated;
4) The response of a particular unit is difficult to control over a production spread; and
5) Audible noise is generated in "burst mode" operation.

The disadvantages of random "burst" operation have been addressed in U.S. Pat. Nos. 5,481,178, 5,731,694 and 5,994,885 to Wilcox, et al. In those patents, "burst" operation is still used, but the burst rate is dependent on the output capacitor and the offset current $I_1$. The circuits of these patents have an off-time control but only for the purpose of limiting the switching frequency to keep it out of the audible range.

A need consequently still exists for a reliable, predictable, controllable and quiet power reduction circuit for standby-load or no-load conditions in low-power electronic power supplies.

SUMMARY OF THE INVENTION

The present invention fills the above-stated need by providing a circuit which operates as a conventional ON time modulator under normal load conditions, but switches to a dual mode modulation when the load is reduced to a predetermined level. In the dual mode, the circuit modulates both the ON time and the OFF time simultaneously in opposite directions. By setting the gain of the OFF time control higher than the gain of the ON time control, the switching frequency is reduced as the output power declines. Consequently, the circuit of the invention has the following advantages:

1) Input power is reduced at both no load and light load;
2) No audible noise due to lack of "bursts" under no-load conditions;
3) Predictable behavior at no load;
4) Cut-in level of power saving mode can easily be set by appropriate choice of component values and is therefore repeatable over the production spread; and
5) The circuit has better large-step load response due to the dual mode modulation.

BRIEF DESCRIPTION OF THE DRAWINGS

The forgoing aspects and the attendant advantages of the present invention will become more readily appreciated by reference to the following detailed description, when taken in conjunction with the accompanying drawings, wherein.

DETAILED DESCRIPTION OF THE INVENTION

Figure 1:
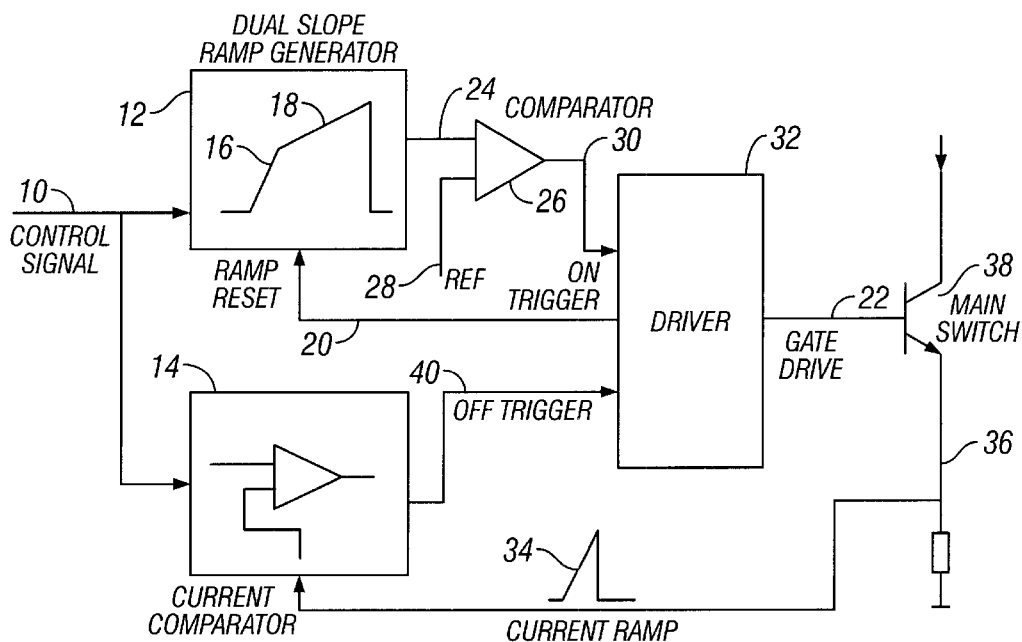
FIG. 1 is a block diagram illustrating the basic function the inventive components of the converter circuit.

The block diagram of FIG. 1 illustrates the components which control the operation of the inventive converter circuit. A load-responsive feedback control signal 10, which is an inverse function of the load on the power supply output, is applied to a dual slope ramp generator 12 and to a current comparator 14. The dual slope ramp generator 12 generates a ramp signal having a first slope with a steep, fixed gradient 16 followed by a less steep slope 18 that is modulated by the feedback control signal 10. The gradient of the first slope, the rate of change of the second slope, the minimum gradient of the second slope, and the turning point from the first to the second slope are all determined by component values in the circuit as discussed below. The ramp generator 12 is reset by the ramp reset signal 20 when the gate drive 22 is ON .

The ramp signal 24 generated by the dual slope ramp generator 12 is compared by a comparator 26 to a reference 28. When the ramp signal 24 exceeds the reference 28, an ON trigger signal 30 is coupled to a gate driver 32.

ON time modulation of the main switch 38 is generated in a conventional way. A current comparator 14 compares the control signal 10 to a current ramp signal 34 which is generated in line 36 during the ON time of main switch 38 by the flyback action of the converter. When the current in line 36 exceeds the current of control signal 10, the current comparator 14 couples an OFF trigger signal 40 to the gate driver 32. The relationship of the control signal 10 to the current in line 36 is such that the ON time of switch 38, which is a direct function of the load, can become minimal but not zero at no load.

Figure 2:
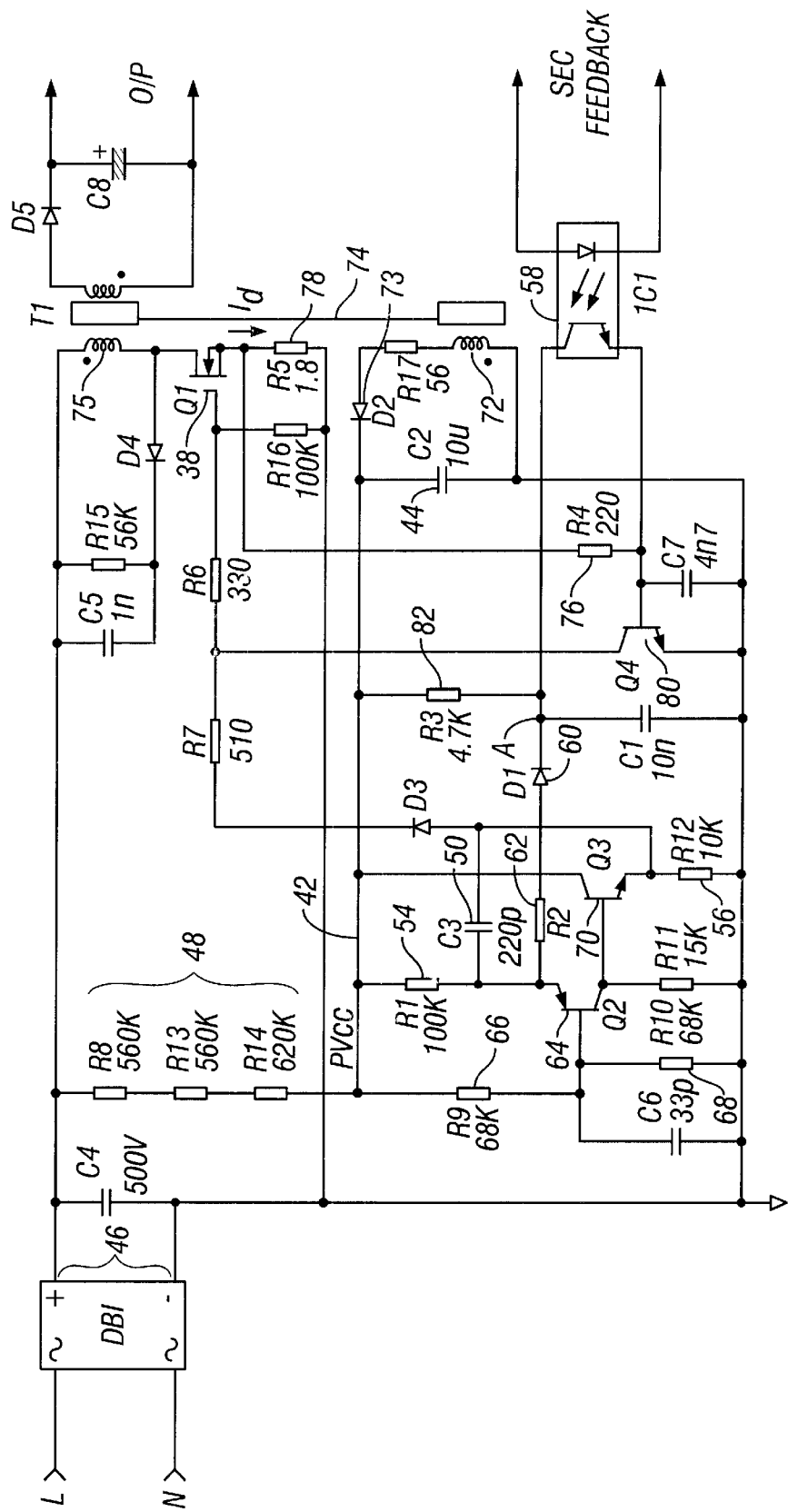
FIG. 2 is a circuit diagram of a preferred embodiment of a flyback converter circuit of this invention.

FIG. 2 illustrates a first preferred embodiment of the inventive flyback converter circuit. It operates as follows: On startup, a voltage $PV_{cc}$ is conventionally developed on line 42 as capacitor 44 is charged from the input voltage 46 through voltage divider resistors 48. A capacitor 50 is concurrently charged from $PV_{cc}$ through resistors 54 and 56. During startup, the current sink 58 is off and diode 60 is reverse biased, so that resistor 62 does not affect the charging of capacitor 50. The voltage of capacitor 50 is compared to the bias voltage of transistor 64, which is set at ½ $PV_{cc}$ by voltage divider resistors 66 and 68. When the charge on capacitor 50 reaches ½ $PV_{cc}$, a pulse of amplitude $PV_{cc}$ is generated on the emitter of transistor 70. This pulse peak charges the gate of the main switch 38 and initiates the switching cycle, causing the generation of $PV_{cc}$ to be taken over by the auxiliary winding 72 of transformer 74 via diode 73 and capacitor 44.

The ON time of main switch 38, during which energy is stored in the primary winding 75 of transformer 74, is controlled by the OFF trigger signal 40 of FIG. 1.

The OFF trigger signal 40 is generated as follows: The control current sink 58 is controlled by the voltage feedback loop signal 10 which is a function of the load. The current sink 58 produces a DC bias voltage equal to $I_c*(R_{76}+R_{78})$ on the base of transistor 80. Resistor 78 is a current sense resistor of very low impedance as compared to resistor 76, so that the bias voltage on the base of transistor 80 is essentially $I_c*R_{76}$. When the main switch 38 turns on, its drain current $I_d$ ramps up so that a ramp voltage $I_d*R_{78}$ is produced and added to the bias produced by current sink 58. Eventually, the total base bias on transistor 80 reaches the threshold of 0.6V at which point transistor 80 turns on and discharges the gate of main switch 38 to turn it off. Thus, the ON time of main switch 38 is controlled only by the load-responsive current sink 58 and the values of resistors 76 and 78 in a conventional manner.

In accordance with the invention, the OFF time of main switch 38, during which energy is released by primary winding 75, is not fixed as in conventional flyback converters, but is controlled differently at high loads than at low loads or no load. The inventive OFF time modulation works as follows (to generate the ON trigger signal 30): When the main switch 38 turns off, capacitor 50 charges up from $PV_{cc}$ through resistors 54 and 56 just as on start-up. The OFF time of main switch 38 is determined by the time required to charge capacitor 50 to ½ $PV_{cc}$. The charging time t of capacitor 50 is $$t=-C_{50}R_{54+56}*\ln(1-V_{50}/PV_{cc}).$$

Unlike at startup, however, diode 60 may no longer be back-biased, and some of the charging current of capacitor 50 may be diverted through resistor 62, depending upon the voltage drop across resistor 82. At high load, the main switch drain current $I_d$ is high and the current through current sink 58 is low enough to maintain the voltage drop across resistor 82 at less than ½ $PV_{cc}$. Diode 60 is still reverse biased, and $$t=-C_{50}*R_{54+56}*\ln(1-½PV_{cc}/PV_{cc})=0.7C_{50}*R_{54+56}.$$

These quantities being constant, the OFF time at high loads is constant, and the switching frequency depends only on the ON time modulation provided by the OFF trigger signal 40.

If the load is now reduced to a level such that the current $I_c$ through current sink 58 becomes high enough to produce a voltage drop across resistor 82 greater than ½ $PV_{cc}$, the OFF period of main switch 38 is no longer constant. To simplify the analysis of what happens, the following assumptions can be made: a) the current through resistor 62 and diode 60 (which is now no longer reverse-biased) is so small compared to $I_c$ that it has no significant effect on the main control loop nor on the bias voltage across resistor 82; b) the forward voltage drop across diode 60 is negligible; and c) resistor 54 is very much greater than resistor 56 so that resistor 56 can be disregarded in the charging process of capacitor 50.

With the foregoing assumptions in mind, the charging process of capacitor 50 can be seen to be divided into two stages. In the first stage, capacitor 50 charges from zero to $PV_{cc}-(I_c*R_{82})$ in the same manner as described above for high loads. In the second stage, capacitor 50 charges from $PV_{cc}-(I_c*R_{82})$ to ½ $PV_{cc}$. In the second stage, charging is slower because some of the charging current is diverted through resistor 62 and diode 60. The charging time $t_1$ of the first stage is simply $$t_1=-C_{50}*R_{54}*\ln(I_c*R_{82}/PV_{cc}).$$

In computing the charging time $t_2$ of the second stage, the equivalent charging voltage source is $$V_0=[PV_{cc}*R_{62}+(PV_{cc}-I_c*R_{82})*R_{54}]/(R_{54}+R_{62}),$$

which resolves into $$V_0=PV_{cc}-(I_c*R_{82}*R_{54}/(R_{54}+R_{62}))$$

With the equivalent output impedance being $$R=R_{54}*R_{62}/(R_{54}+R_{62}),$$

the second stage charging time is $$t_2=-C_{50}*R*\ln(1-½PV_{cc}/V_0)+C_{50}*R*\ln[1-(PV_{cc}-(I_c*R_{82}))/V_0].$$

Because $V_0$ decreases with increasing $I_c$, both terms of the $t_2$ equation increase with increasing $I_c$. Consequently, as the load approaches the standby-load or no-load condition, capacitor 50 takes longer to charge, the OFF time of main switch 38 gets longer, and the switching frequency drops.

Figure 3:
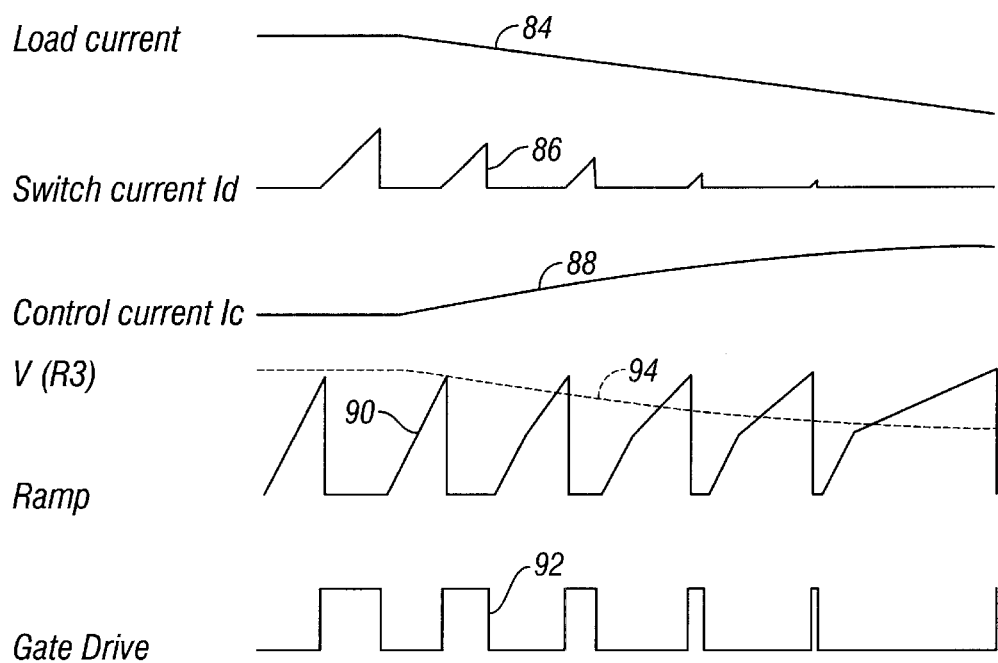
FIG. 3 is a waveform diagram showing various waveforms in the circuit of FIG. 2.

The operation of the inventive circuit of FIG. 2 is illustrated in FIG. 3, in which graph 84 depicts the load current, graph 86 depicts the main switch current $I_d$, graph 88 depicts the control current $I_c$, graph 90 depicts the charging ramp of capacitor 50, and graph 92 depicts the resulting gate drive for main switch 38. The dotted graph 94 depicts the voltage of node A, the junction of resistor 82 and diode 60, with reference to common. The threshold value of the control current $I_c$ at which the OFF time modulation starts can be adjusted by an appropriate selection of $R_{82}$. The threshold control current $I_{c(th)}$ is determined by $R_{82}$ in accordance with the formula $I_{c(th)}=½ PV_{cc}/R_{82}$. Once $R_{82}$ is chosen, the OFF time change rate can be adjusted by varying $R_{62}$. The smaller $R_{62}$, the greater the charging current diverted from resistor 54 and the higher the OFF time change rate. If $R_{62}$ is made too small, however, capacitor 54 can never be charged up to ½ $PV_{cc}$, and the circuit goes into an undesirable clamped low frequency mode in which $I_c$ starts to oscillate. By postulating an infinite OFF time at zero load, the minimum value of $R_{62}$ can be calculated to be $$R_{62\ min} = R_{54}*[1.2*R_{82}/(R_{76}*PV_{cc})-1].$$

Figure 4:
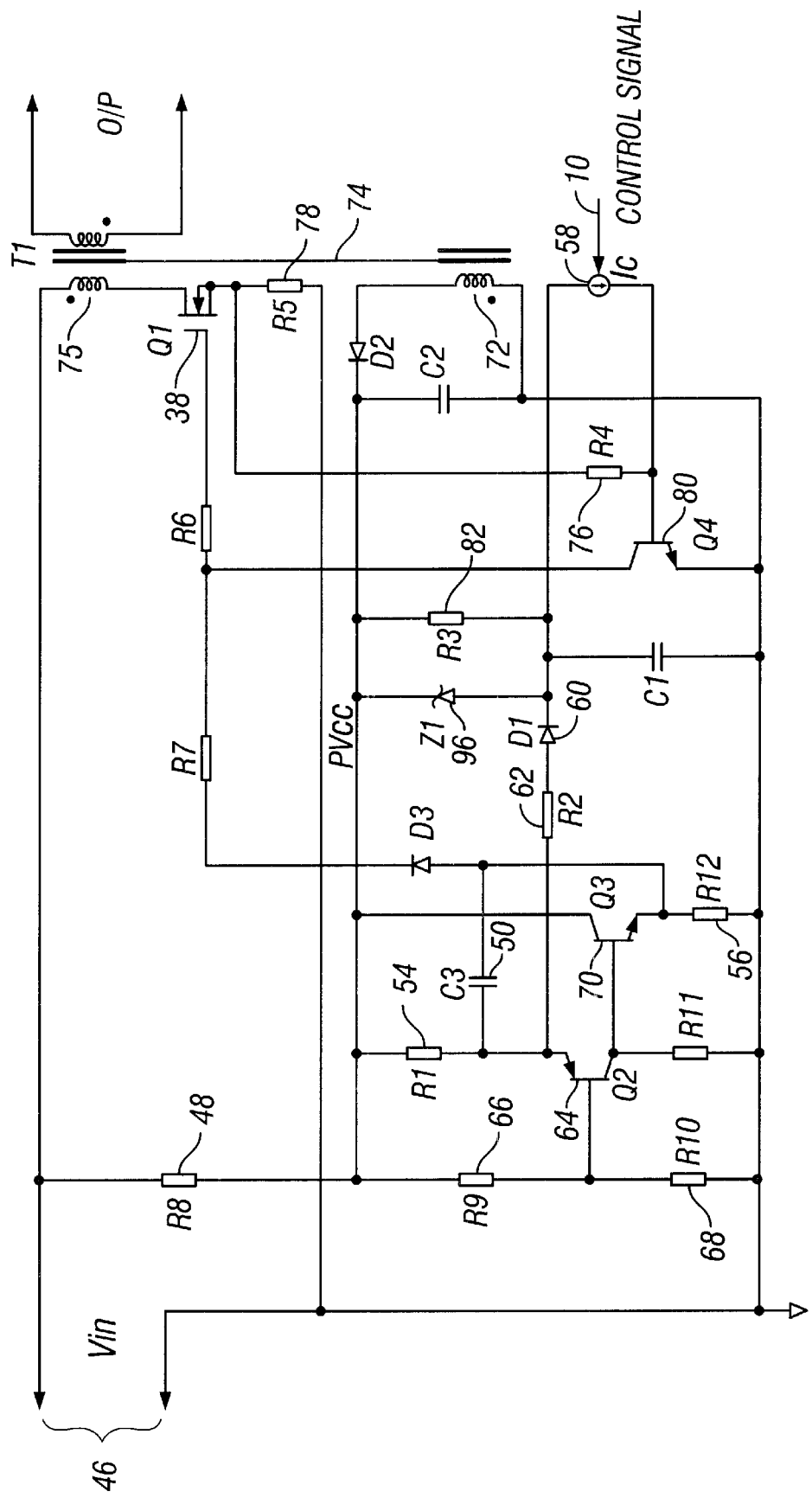
FIG. 4 is a circuit diagram of an alternative embodiment of a flyback converter circuit of the invention.
Figure 5:
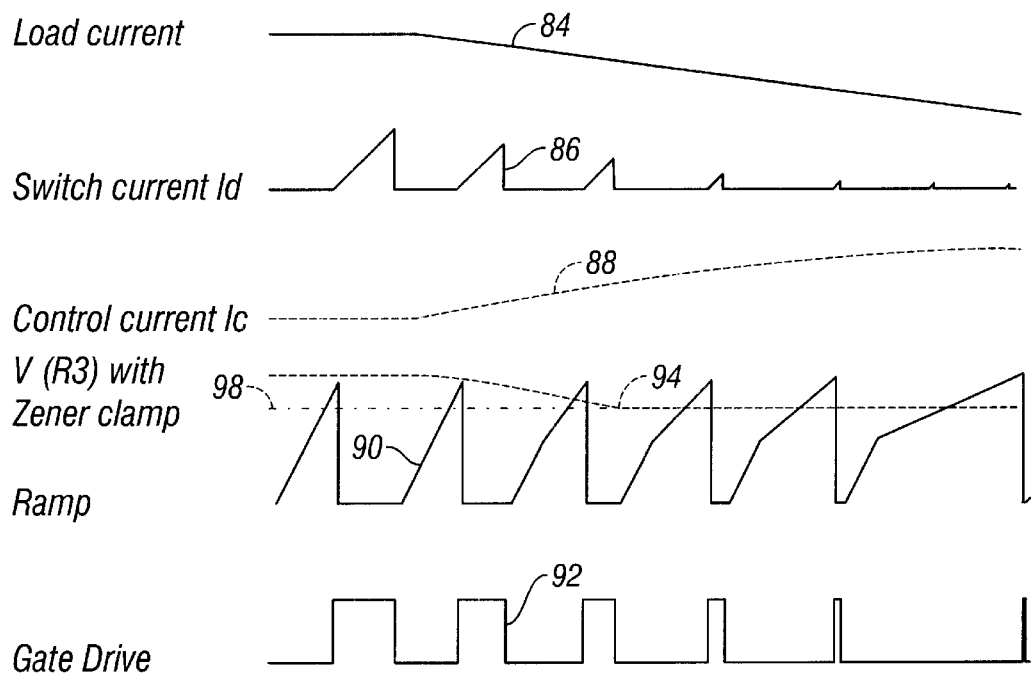
FIG. 5 is a waveform diagram showing various waveforms in the circuit of FIG. 4.

In practice, where some small amount of power is dissipated to the output circuit even at no load, $R_{62}$ must be kept sufficiently above its minimum value to prevent the switching frequency at zero load from falling below the minimum necessary to keep the output rail in regulation An alternative way to prevent clamped low frequency operation is shown in the embodiment of a flyback converter shown in FIG. 4. In this alternative embodiment, a zener clamping diode 96 is coupled in parallel with resistor 82 to limit the voltage drop across resistor 82. The clamping action of zener diode 96 prevents $t_2$ from becoming excessively large and thereby allowing the switching frequency to drop below acceptable limits. The effect of the zener diode 96 on the operation of the circuit is shown in FIG. 5, which uses the same graphs as FIG. 3 but shows voltage 98 as the zener clamping voltage. Although the zener diode 96 has no effect on the ON time of main switch 38, which is regulated by $I_c$, it does prevent the OFF time from increasing any further once $I_c$ has reached the level of $V_2/R_{82}$, where $V_Z$ is the zener voltage.

Some specific examples of appropriate settings of the inventive circuit are as follows: For a PC power supply auxiliary converter such as a 10 W auxiliary supply, the "Blue Angel" condition in standby mode is defined as a 5 W input. The desirable working frequencies are about 60 kHz from 10 W to 7 W and about 25 kHz below 7 W. For that purpose, $R_{82}$ would be chosen in the inventive circuit to start the frequency reduction at 7 W. The voltage drop across resistor 82 at 5 W can then be calculated, and in the embodiment of FIG. 4 a zener diode of that voltage would be shunted across resistor 82. Finally, resistor 62 would be selected to set the switching frequency to 25 kHz at 5 W.

For a cell phone charger or adapter, the "Blue Angel" condition is defined as no load. Desirable working frequencies for a 6.5 W charger are about 60 kHz from 6.5 W to 3 W, decreasing to less than 1 kHz at no load. $R_{82}$ is first set at 4.7K to set the onset of frequency reduction at 3 W. $R_{62\ min}$ is then calculated to be about 42K at a $PV_{cc}$ of 18V. With that value of $R_{62}$, the circuit will just enter the clamped low frequency mode at no load.

Figure 6:
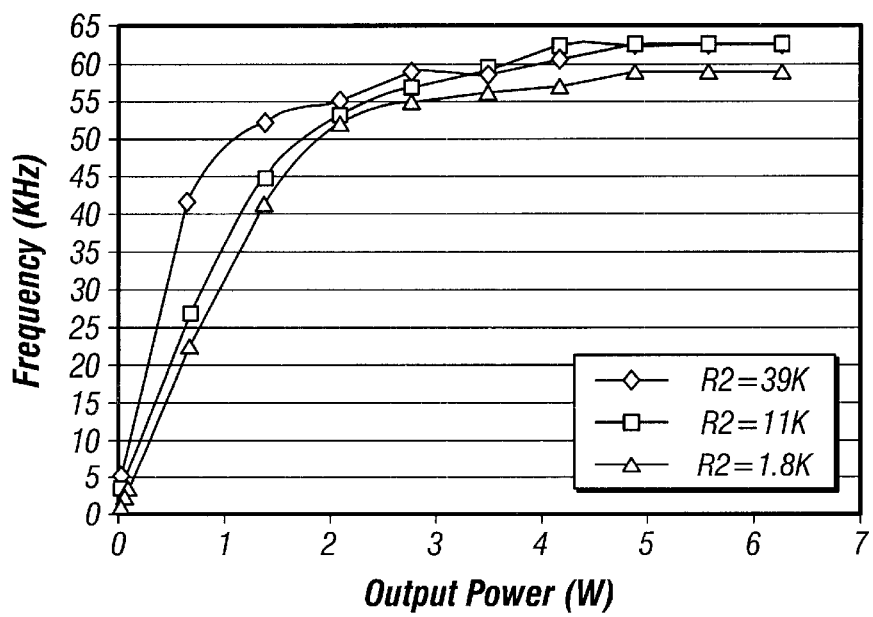
FIG. 6 is an output power vs. switching frequency diagram for the circuit of FIG. 2.

The circuit of this invention provides power savings of about 0.15 W in the second example over a corresponding prior art circuit at no load. At a light load of about 0.1 W output power, which in the prior art would be just before the onset of the "burst" mode, the savings are even greater: about 0.25 W. FIG. 6 illustrates the sharp decline in switching frequency as the output power approaches the no-load condition in a 6.5 W charger with a 39K value of $R_{62}$.

As a matter of illustration, component values have been indicated in FIG. 2. These are, however, given only as examples, and it should be understood that the invention can be carried out in many different ways encompassed by the scope of the following claims. In general, the embodiments of the apparatus described above are illustrative of the principles of the present invention and are not intended to limit the invention to the particular embodiments described. Other embodiments of the present invention can be adapted for use in standby power or no-load environment. Accordingly, while the preferred embodiment of the invention has been illustrated and described, it will be appreciated that various changes can be made therein without departing from the spirit and scope of the invention.

What is claimed is:

1. A method of reducing the power consumption under low-load or no-load conditions of a flyback power converter using a pulsed current switch to control current flow through the primary winding of the flyback transformer, comprising the steps of:
    a) maintaining the OFF time of said switch constant when the load on said converter exceeds a predetermined level, and
    b) increasing the OFF time of said switch as an inverse function of said load when said load is below said predetermined level.

2. The method of claim 1, in which the ON time of said switch is a direct function of said load, and said OFF time increases more rapidly than said ON time decreases when said load is decreasing below said predetermined level.

3. The method of claim 1, in which the increase of said OFF time with decreasing load is limited to a predetermined maximum OFF time value.

4. A method of reducing the power consumption under low-load or no-load conditions of a flyback power converter using a pulsed current switch to control current flow through the primary winding of the flyback transformer, comprising the steps of:
    a) producing a control signal representative of the load on said converter;
    b) applying said control signal to a ramp generator to cause said ramp generator to generate a ramp having first and second stages, the first stage having a steep, substantially constant slope, and the second stage having a shallower, variable slope which is a function of said control signal;
    c) comparing said ramp to a fixed reference; and
    d) turning said switch ON when said ramp exceeds said reference.

5. The method of claim 4, further comprising the steps of
    e) comparing said control signal to a signal representative of the current through said switch; and
    f) turning said switch OFF when said switch current representative signal exceeds said control signal.

6. A circuit for saving power in a power supply at low load or no load, comprising:
    a) a switch;
    b) a transformer having a primary winding so connected as to store energy when said switch is ON and to release it when said switch is OFF;
    c) a control signal source arranged to provide a control current signal which is an inverse function of the load on said power supply;
    d) circuitry arranged to turn said switch OFF when current through said primary winding exceeds said control current signal;
    e) a capacitor connected to turn said switch ON when said capacitor is charged above a predetermined level; and
    f) circuitry arranged to charge said capacitor at a single, substantially fixed rate when said control current signal is below a predetermined level, and at a two-stage rate when said control current signal is above said predetermined level;
    g) said two-stage rate including a first stage in which the charging rate is fixed, and a second stage in which the charging rate is slower and is variable as a function of said current control signal.

7. The circuit of claim 6, in which the charging rate during said second stage is slowed by diverting from the charging circuit of said capacitor a portion of the available charging current that is a function of said control current signal.

8. The circuit of claim 7, further comprising a zener diode connected to limit the diversion of charging current from the charging circuit of said capacitor.

9. The circuit of claim 6, in which the effect on the switching frequency of said switch of the slowing charging rate with decreasing load in said second stage is greater than the effect on said switching frequency of the shortening of said ON time by the increase in said control current signal with decreasing load.

10. The circuit of claim 9, in which said second stage charging rate is so varied as a function of said control current signal that said switching frequency is substantially zero at no load.

* * * * *